June 1, 1965  P. PATRIARCHE ETAL  3,186,445
APPARATUS FOR MANUFACTURING ELECTRON TUBE GRIDS
Filed June 29, 1960
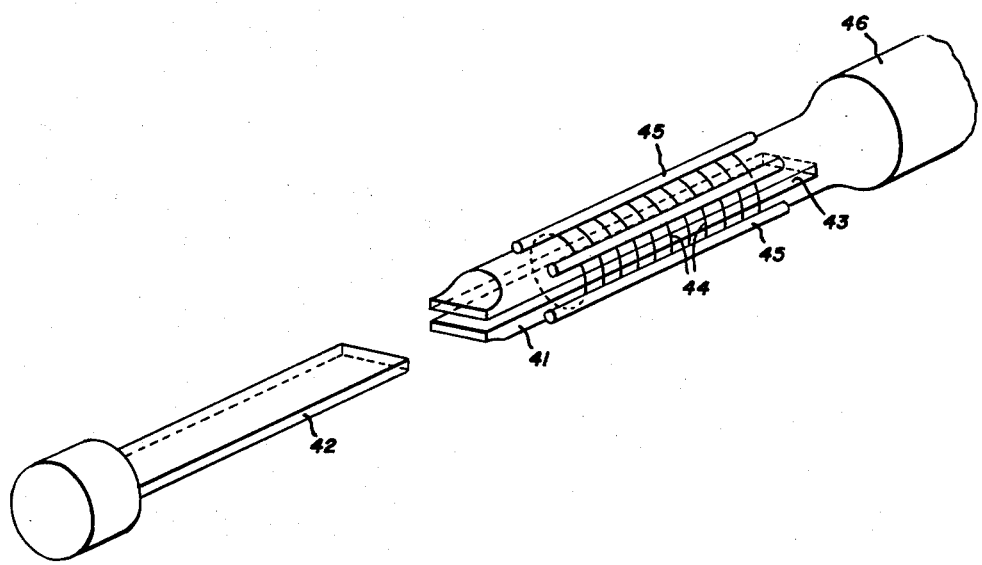
INVENTORS:
PIERRE PATRIARCHE,
PIERRE O. KAHN,
BY Robert J. Mooney
THEIR ATTORNEY.

3,186,445
APPARATUS FOR MANUFACTURING
ELECTRON TUBE GRIDS
Pierre Patriarche, Courbevoie, and Pierre O. Kahn, Paris,
France, assignors to Compagnie Industrielle Francaise
des Tubes Electroniques, Courbevoie, France
Filed June 29, 1960, Ser. No. 39,521
4 Claims. (Cl. 140—71.5)

The present invention relates to improvements in electron tube grids and apparatus for making the same.

There is described and claimed in commonly assigned copending application S.N. 821,168, filed June 18, 1959, now Patent No. 3,094,150, a process of fabricating certain electron tube grids, consisting of welding, by electrical resistance welding, posts or frame elements on a layer of wires previously wound under tension in a helix on a rotatable cylindrical mandrel of large thermal and electrical conductivities. The posts are preferably oriented along generatrices of the mandrel cylinder, so as to be thereby substantially normal to the grid wire. An important advantageous effect of that process is the elimination of all residual expansion of the wires after welding, the heat generated along the weld line being immediately absorbed by the mandrel. The said copending application describes in particular the fabrication of single frame grids, i.e., grids consisting of a flat frame on which is stretched a single sheet of wires.

The object of the present invention is the fabrication of an individual grid of the type which encloses the cathode entirely, with the use of a demountable forming mandrel, composed of a bar of large thermal and electrical conductivity, such as copper, with a longitudinal recess into which can be inserted an auxiliary piece, shaped like the recess, so that when the auxiliary piece is in place, the assembly makes a rigid mandrel, but when the piece is removed, may be deformed elastically enough to remove the grid, by squeezing the mandrel.

In grid fabrication with such a mandrel, the grid wire is first wound onto the mandrel and the posts are then welded to the wires along generatrices of the mandrel cylinders in the manner hereinabove described and described more fully in the above referenced copending application.

In addition, grids of this construction, in contrast to the usual method, with internal posts, present the advantage of being realizable with considerably smaller dimensions, and they retain rigorously the shape of the mandrel, so that for grids which are surfaces of revolution, for example, the interior diameter is perfectly defined, which permits a maximum reduction of the grid-cathode space.

The invention will be better understood by reference to the attached drawing which is a perspective view of one form of mandrel used in the fabrication of an individual grid which completely surrounds the cathode, in accordance with the invention.

The mandrel represented in the drawing for the fabrication of a grid of the type which surrounds completely a cathode is composed of a bar of copper 41, forming the body of the mandrel, and an auxiliary piece 42 in the form of a rather flat parallelepiped, which can be inserted in the slot 43, of the same form, in the mandrel, said mandrel being represented with grid 44, complete with posts 45, supposed to be welded on.

Mandrel 41 is prolonged in a tail 46 which permits the mandrel to be a solid part of a welding electrode, the second electrode, not shown, being applied to the posts 45 of the grid 44. Upon winding of grid wire 44 on the assembled mandrel, the posts may be welded to the exterior of the helix of wire 44, and then when piece 42 is withdrawn from slot 43, the resilience of the tine portions of bar 41 permits sufficient elastic compression thereof so that the finished grid can be readily removed from the mandrel.

What we claim as new and desire to secure by Letters Patent of the United States is:

1. Apparatus for making grids for electron discharge devices, comprising an elongated mandrel of high thermal conductivity and having an axial slot extending along a predetermined portion thereof, an insert member of high thermal conductivity adapted to be snugly received in said slot, means for winding a layer of lateral wire onto said mandrel in relatively high heat-exchanging contact therewith, in a helix of desired pitch and with said insert member positioned in said slot, means for applying a plurality of grid support elements over said helix in contact therewith and in predetermined spaced array, and welding means including said mandrel as one electrode thereof for welding the support wires to portions of said helix.

2. Apparatus for making grids for electron discharge devices, comprising an elongated mandrel of high thermal conductivity and having an axial slot extending along a predetermined portion thereof rendering said mandrel portion normally flexible as compared to the unslotted portion thereof, an insert member of high thermal conductivity adapted to be snugly received in said slot, means for winding a layer of lateral wire onto the slotted portion of said mandrel in relatively high heat-exchanging contact therewith, in a helix of desired pitch and with said insert member positioned in said slot whereby the flexible portion of the mandrel is rendered relatively inflexible, means for applying a plurality of grid support elements over said helix in contact therewith and in predetermined spaced array, welding means including said mandrel as one electrode thereof for welding the support wires to portions of said helix, and means to remove said insert member to render the mandrel relatively flexible permitting easy removal of the grid therefrom.

3. Apparatus for making grids for electron discharge devices, comprising an elongated mandrel of high thermal conductivity and having an axial slot extending along a predetermined portion thereof, an insert member of high thermal conductivity adapted to be snugly received in said slot, means for winding lateral wire onto said mandrel in relatively high heat-exchanging contact therewith, in a helix of desired pitch and with said insert member positioned in said slot, means for applying a plurality of grid support elements over said helix in contact therewith and in predetermined spaced array, and welding means including said mandrel as one electrode thereof for welding the support wires to portions of said helix.

4. Apparatus for making grids for electron discharge devices, comprising an elongated mandrel of high thermal conductivity and having an axial slot extending along a predetermined portion thereof defining a pair of tines, an insert member of high thermal conductivity adapted to be snugly received in the space between said tines, means for winding a layer of lateral wire onto said tines in relatively high heat-exchanging contact therewith, in a helix of desired pitch and with said insert member positioned between said tines, means for applying a plurality of grid support elements over said helix in contact therewith and in predetermined spaced array, and welding means of which one electrode is provided by said tines for welding the support wires to portions of said helix.

References Cited by the Examiner

UNITED STATES PATENTS

| | | | |
|---|---|---|---|
| 1,920,274 | 8/33 | Pidgeon et al. | 140—71.5 XR |
| 2,000,163 | 5/35 | Clark | 140—71.5 |
| 2,004,246 | 6/35 | Kershaw | 140—71.5 |
| 2,422,827 | 6/47 | Drieschman et al. | 140—112 |
| 2,473,858 | 6/49 | Butler | 219—56 |
| 2,812,499 | 11/57 | Robertson | 140—71.5 XR |

CHARLES W. LANHAM, *Primary Examiner.*

NEDWIN BERGER, RICHARD A. WAHL, WILLIAM F. PURDY, *Examiners.*